US005758403A

United States Patent [19]

Fallandy

[11] Patent Number: 5,758,403

[45] Date of Patent: Jun. 2, 1998

[54] IMPACT TOOL WIRE-INSERTION HEAD HAVING SELECTIVE CUT/NO CUT BLADE CONFIGURATION

[75] Inventor: Michael M. Fallandy, Ventura, Calif.

[73] Assignee: Harris Corporation, Melbourne, Fla.

[21] Appl. No.: 688,535

[22] Filed: Jul. 30, 1996

[51] Int. Cl.$^6$ .......... B23P 23/00

[52] U.S. Cl. .......... 29/566.4; 29/33 M; 29/750; 29/758

[58] Field of Search .......... 29/33 M, 566.2, 29/566.3, 566.4, 566.1, 750, 751, 758

[56] References Cited

U.S. PATENT DOCUMENTS

| | | | |
|---|---|---|---|
| 4,434,542 | 3/1984 | Forberg et al. | 29/33 M |
| 4,567,639 | 2/1986 | Fasano | 29/566.4 |
| 4,682,412 | 7/1987 | Pfeffer | 29/750 |
| 4,696,090 | 9/1987 | Gregson et al. | 29/566.4 |
| 5,175,921 | 1/1993 | Krietzman | 29/566.4 |
| 5,195,230 | 3/1993 | Krietzman | 29/566.4 |
| 5,613,297 | 3/1997 | Dvorak et al. | 29/566.4 |

*Primary Examiner*—A. L. Pitts
*Assistant Examiner*—Christopher Kirkman
*Attorney, Agent, or Firm*—Charles E. Wands

[57] ABSTRACT

A wire-insertion and cutting head assembly for a telephone wire impact-type termination tool is selectively operable to effect either a non-cutting mode of operation, or a cutting mode of operation, by selectively positioning a rotatable cam pin-based arrangement. The cam-pin based arrangement is configured such that, for a first rotational pin orientation, during axial translation of the wire insertion blade into the bore of the blade receptacle, the axial bore of the shaft portion of the wire insertion blade passes by the cylindrical shaft portion of the cam pin, and a cam-shaped surface of the cam pin enters into and passes through a reduced width region of a cam-shaped opening of a scissor-shaped blade, which prevents rotation of the cutting blade. To seat and cut a wire, the cam pin is rotated to a second orientation, so that the cylindrical surface of the pin shaft is alongside a flared edge portion of the cam-shaped opening, whereby the cylindrical shaft portion of the cam pin will engage the curved surface of the cam-shaped opening in the wire-cutting blade and cause the wire-cutting blade to rotate across the depression in the wire insertion blade and sever a wire.

11 Claims, 5 Drawing Sheets

IMPACT TOOL WIRE-INSERTION HEAD HAVING SELECTIVE CUT/NO CUT BLADE CONFIGURATION

FIELD OF THE INVENTION

The present invention relates in general to wire insertion (impact) tools of the type employed in the telephone industry for seating and cutting the free end of a telephone wire into a resilient terminal receptacle that is mounted to a connector block of a telephone office mainframe, and is particularly directed to a new and improved impact wire-insertion head, having a wire-insertion blade and associated scissor-configured, wire-cutting blade assembly that allows the assembly to be selectively operated in either a wire-cutting or no-cutting mode of operation, as the wire is urged into the receptacle by the wire-insertion blade portion of the assembly.

BACKGROUND OF THE INVENTION

The telephone industry currently offers its craftspersons a variety of impact tool configurations for cutting and seating individual telephone wires in terminal blocks that are mounted to telephone office mainframe units. For a non-limiting illustration of documentation describing examples of such impact tools, attention may be directed to U.S. Pat. Nos. 5,195,230, 4,696,090, 4,567,639, and 4,241,496 and the patents cited therein.

A typical impact tool has a generally longitudinal handle from which a wire-insertion and cutting head extends. The interior of the handle may contain an axially translatable hammer element, which is biased by a compression spring to strike the head, and thereby seat and/or cut a wire that has been inserted into a wire capture and gripping end region of the head. As the craftsperson grasps the handle and pushes it against a wire in a terminal receptacle, a hammer release element within the handle is moved into alignment with the hammer travel path, so that the force stored in a main spring is mechanically released, causing the hammer to rapidly impact the head, whereby the end of the wire is cut and becomes securely seated in the terminal block.

Since terminal blocks are made by a variety of manufacturers and come in different shapes and sizes, the craftsperson must carry different types of wire installation devices. To reduce this equipment inventory requirement, at least one manufacturer (e.g., Harris Dracon) currently manufactures a universal type of impact tool, such as its Model D814 automatic impact tool, which has a handle-installed impact mechanism, that is configured to interface with and provide an impact force to a wire insertion blade head attachment at the forward end of the handle. Since the blade head attachment is simply that—a blade head attachment, the impact mechanism is independent of the blade head configuration.

The problem is the fact that the blade heads currently offered for attachment to such a universal type of impact tool are configured for either insertion mode only (namely, they only insert, but do not cut the wire once seated), or insertion and cutting mode (in which they both seat in the terminal block and cut the wire). Moreover, those manufacturers which do offer blade head configurations that can be used for both insertion and cutting mode provide a tool having a custom integrated impact handle and wire installation head arrangement, in which the handle contains a uniquely configured control mechanism that engages a specially designed head to selectively execute the desired operation. However, since such a handle is not universal, it cannot be used with other types of heads, and the fundamental problem described above remains.

SUMMARY OF THE INVENTION

In accordance with the present invention, the shortcomings of a conventional wire-insertion and cutting head of a telephone craftsperson's impact tool described above are effectively obviated by a wire-insertion and cutting head assembly, which is selectively operable to effect either a non-cutting (wire-seating only) mode of operation, or a cutting (wire seating and severing) mode of operation.

For this purpose, the wire-insertion and cutting head assembly of the invention comprises a generally longitudinally shaped, wire insertion and cutting blade receptacle that is installable in a wire termination tool handle. The blade receptacle has a generally cylindrically shaped end body portion that is sized to engage a blade mounting fixture of the termination tool handle. The body portion of the head's receptacle is integral with a wider diameter bayonet portion that secures the receptacle to the handle. The bayonet portion of the blade receptacle is contiguous with a generally rectangularly shaped blade engagement portion, that has flat top and bottom surfaces and side surfaces. A recess region is axially set back into the receptacle and is sized and shaped to accommodate a wire insertion blade. The blade receptacle has an axial bore which receives a compression spring and a shaft portion of the wire insertion blade. It also has a transverse bore that is orthogonal to the axial bore and is sized to receive a generally cylindrically shaped cam pin that passes through a slot in a shaft portion of the wire insertion blade.

The head of the cam pin has a raised key element configured to be easily seized by a craftsperson to enable the pin to be rotated between first and second rotational positions about its longitudinal axis within the transverse bore of the blade receptacle. Immediately beneath and adjacent to the head end of the cam pin is an indented, cam-shaped surface region. For a first rotational position of the cam pin, associated with insertion mode only, during translation of the wire insertion blade into the axial bore of the blade receptacle, the cam-shaped surface region causes the cam to enter a cam-shaped opening in a scissor-configured, wire cutting blade, which prevents rotation of the cutting blade. For a second rotational position, associated with insertion and cutting mode of operation, the cam pin will engage the surface of the cam-shaped opening of the wire-cutting blade, causing the wire-cutting blade to rotate about a pivot pin in the wire insertion blade and wire insertion blade, thereby cutting a wire engaged by the wire insertion blade. A generally circular cam-shaped retainer ring is mounted on a base end of the cam pin and is captured between flexible tangs of a retainer clip affixed to the blade receptacle.

The wire insertion blade and cutting blade assembly is configured to be usable with industrial type termination blocks, such as a BIX type termination block manufactured by Northern Telecom, as a non-limiting example. For such a block, the wire insertion blade has a frame-configured base region contiguous with a cylindrical shaft portion, that has a slot through which the cam pin in the blade receptacle passes during relative axial translation between the blade receptacle and blade.

The wire insertion blade has wire insertion depressions configured to receive and engage a wire to be seated in a terminal element. The wire cutting blade for a BIX type termination block is pivotally affixed to the wire insertion blade and has a generally flat scissor having a wire-cutting edge for cutting a wire that has been engaged by the wire insertion depressions of the wire insertion blade. The cam aperture of the cutting blade has a generally linear edge portion spaced apart from an opposing curved edge portion having has a generally linear edge portion parallel to the linear edge portion so as to define a reduced width region therebetween. The curved edge portion flares to increase the width of the opening to a large diameter region.

To effect the non-cutting mode of operation, the cam pin is rotated so that the flat surface portion of its cam-shaped surface region faces the curved edge portion of the cam aperture. This orientation of creates a gap at the flared edge portion where the width of the opening presented by the cam aperture is greatest. With a wire engaged by the depressions of the wire insertion blade, then, during axial translation of the wire insertion blade into the bore of the blade receptacle, the axial bore of the shaft portion of the wire insertion blade passes by the cylindrical shaft portion of the cam pin, and the cam-shaped surface of the cam pin enters into and passes through the reduced width region of the cam-shaped opening of the scissor-shaped blade.

To effect the seating and cutting mode of operation, the cam pin is rotated 180°, so that the flat surface portion of its cam-shaped surface region faces the linear edge portion of the cam aperture. This orientation of the cam pin creates a gap between the linear edge portion and the flat surface portion of the cam-shaped surface region and brings the cylindrical surface of the pin shaft alongside the flared edge portion of the cam aperture.

In this reversed orientation of the cam pin, with a wire seated in the terminal block and engaged by the depressions in the wire insertion blade, then, during axial translation of the wire insertion blade into the blade receptacle, the axial bore of the shaft portion of the wire insertion blade will again translate past the cylindrical shaft portion of pin. However, since the cylindrical surface of the pin shaft is oriented so as to be alongside the flared edge portion of the cam aperture, the cylindrical shaft portion of the cam pin will engage the curved surface of the cam-shaped opening in the wire-cutting blade and thereby cause the wire-cutting blade to rotate across the depression in the wire insertion blade and into a wire that has been captured in the depressions of the wire insertion blade, thus severing the wire.

DETAILED DESCRIPTION

Figure 1:
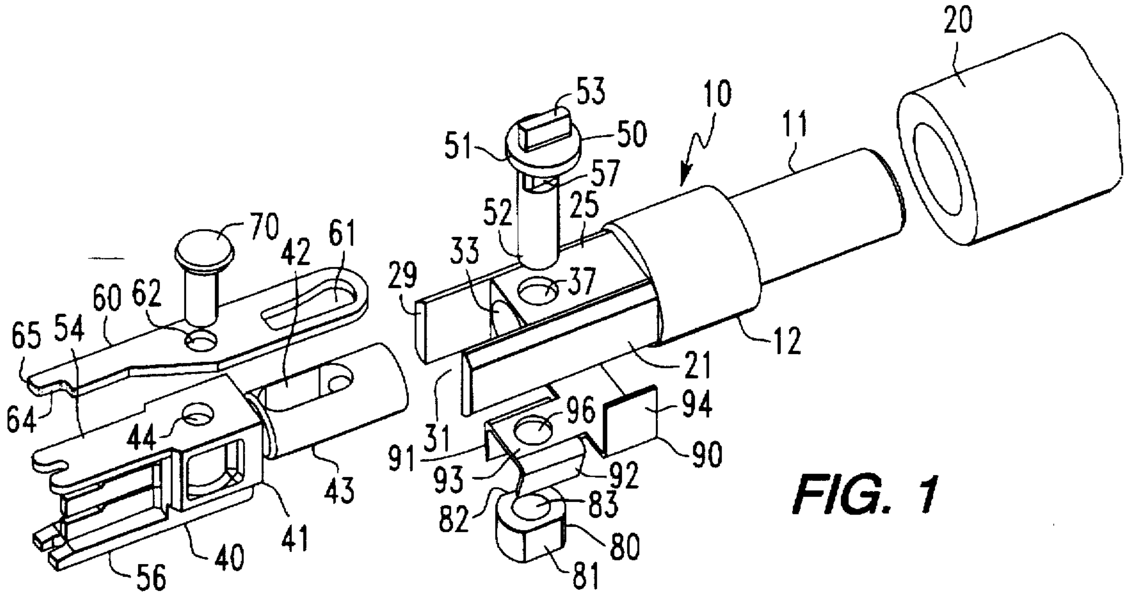
FIG. 1 is a diagrammatic exploded perspective illustration of a wire-insertion and cutting head assembly for a termination tool in accordance with an embodiment of the present invention.
Figure 2:
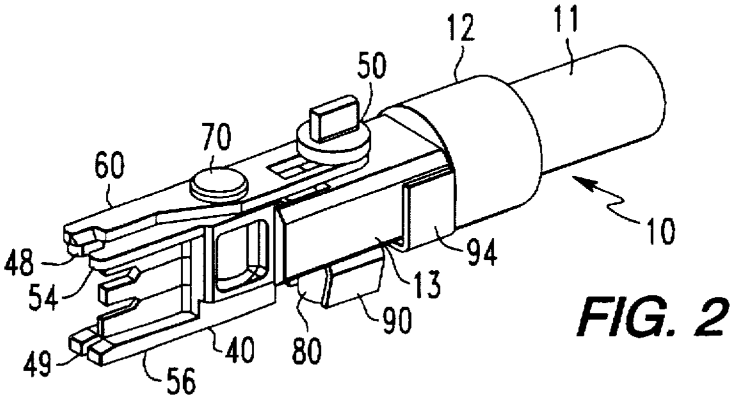
FIG. 2 is a forward perspective assembly view of the wire-insertion and cutting head assembly of FIG. 1.
Figure 3:
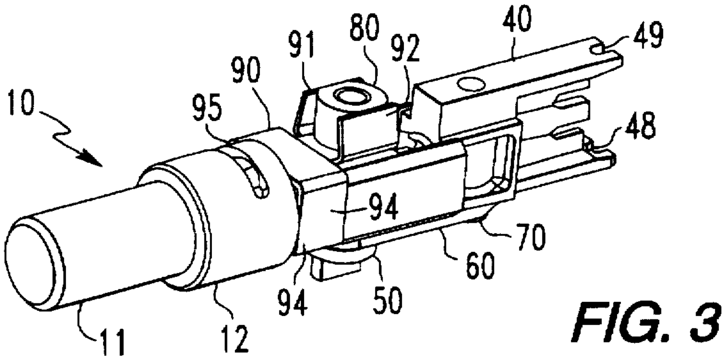
FIG. 3 is a rearward perspective assembly view of the wire-insertion and cutting head assembly of FIG. 1.
Figure 4:
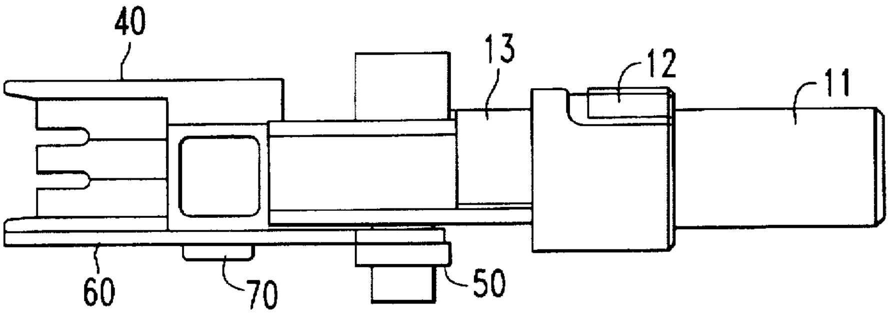
FIG. 4 is a side view of the wire-insertion and cutting head assembly of FIG. 1.
Figure 5:
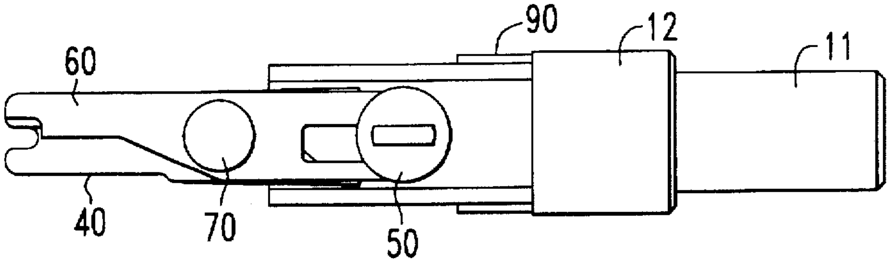
FIG. 5 is top view of the wire-insertion and cutting head assembly of FIG. 1.
Figure 6:
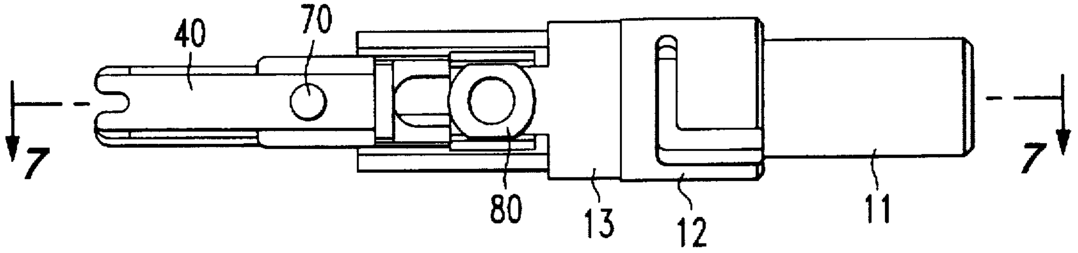
FIG. 6 is bottom view of the wire-insertion and cutting head assembly of FIG. 1.
Figure 7:
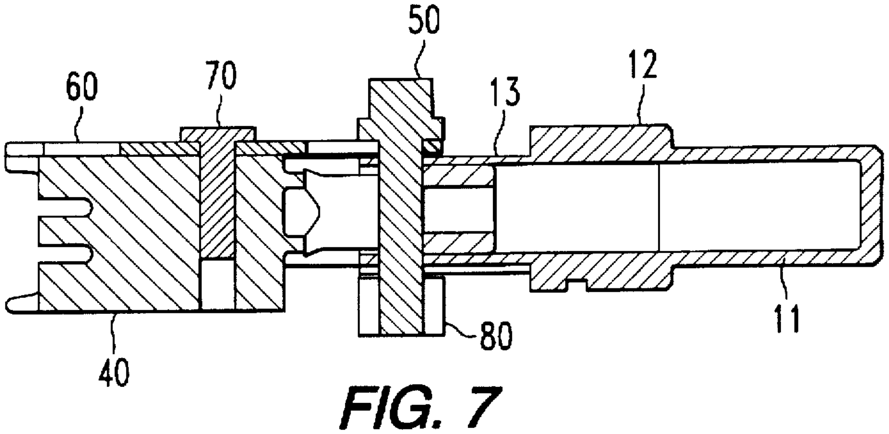
FIG. 7 is side sectional view of the wire-insertion and cutting head assembly of FIG. 1.
Figure 8:
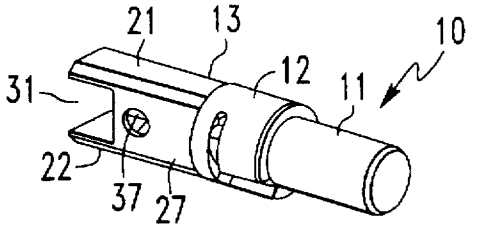
FIG. 8 is a rearward perspective view of a blade receptacle.
Figure 10:
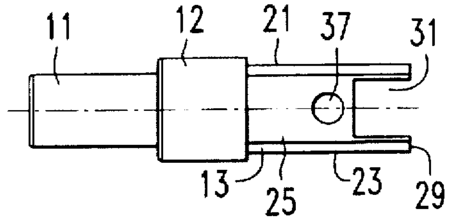
FIGS. 10 and 11 are opposite side views of a blade receptacle.
Figure 9:
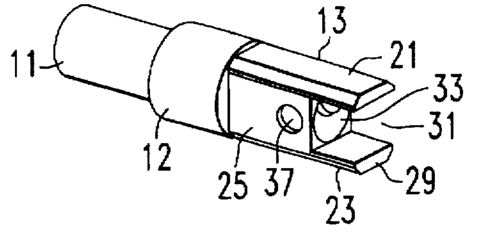
FIG. 9 is a forward perspective view of a blade receptacle.
Figure 11:
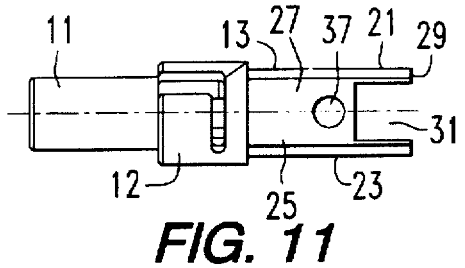
Figure 13:
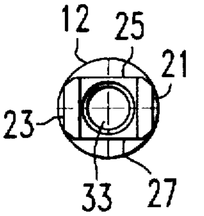
FIG. 13 is an end view of a blade receptacle.
Figure 12:
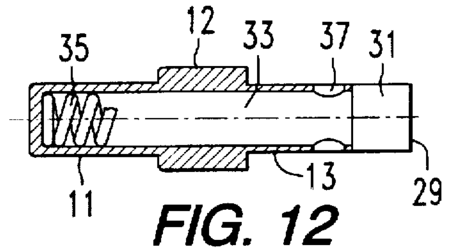
FIG. 12 is a sectional view of a blade receptacle.

The wire-insertion and cutting head assembly for a termination tool in accordance with an embodiment of the present invention will now be described with reference to FIGS. 1–32, in which FIG. 1 is an exploded view of the overall configuration, and FIGS. 2–7 are assembly views thereof, while FIGS. 8–26 show details of the respective components of the overall assembly of FIGS. 1–7. FIGS. 27–32 are simplified cross-sectional views showing the operational sequence for both the non-cutting (wire-seating only) mode of operation, and the cutting (wire seating and severing) mode of operation.

Referring now to FIGS. 1–32, the wire-insertion and cutting head assembly for an impact tool in accordance with the present invention is diagrammatically illustrated as comprising a generally longitudinally shaped, wire insertion and cutting blade receptacle 10, which is installable in a tool handle (shown at 20 in the exploded view of FIG. 1). As shown in detail in the exploded view of FIG. 1, the rearward and forward perspective views of FIGS. 8 and 9, respectively, the opposing side views of FIGS. 10 and 11, the cross-sectional view of FIG. 12 and the end view of FIG. 13, the blade receptacle 10 has a first, generally cylindrically shaped end body portion 11, that is sized to engage an interior portion of the handle 20. Body portion 11 of receptacle 10 is integral with a wider diameter bayonet portion 12 which secures the receptacle to the handle in a conventional manner. Bayonet portion 13 is contiguous with a second, generally rectangularly shaped blade engagement portion 13.

The generally rectangularly shaped blade engagement portion 13 of the blade receptacle 10 has flat or planar, top and bottom surfaces 21 and 23 and side surfaces 25 and 27, which terminate at an end face 29. A generally rectangular cut-out or recess region 31 is axially set back into the blade engagement portion into side surfaces 25 and 27 of generally rectangularly shaped blade engagement portion 13 from its end face 29, and is sized to accommodate a generally rectangular frame-configured base region 41 of a wire insertion blade member 40.

Blade receptacle 10 further includes an axial bore 33, which is sized to receive a compression spring 35 (shown in FIG. 12), and a shaft portion 43 of the wire insertion blade member 40. Blade receptacle 10 further includes a transverse bore 37 that extends between side surfaces 25 and 27 of generally rectangularly shaped blade engagement portion 13 and is generally orthogonal to the axial bore 33. The transverse bore 37 is sized to receive a generally cylindrically shaped cam pin 50, that passes through a slot 42 in a shaft portion 43 of the wire insertion blade 40.

Figure 14:
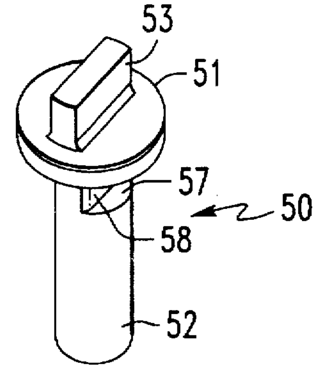
FIG. 14 is a perspective view of a cam pin.
Figure 15:
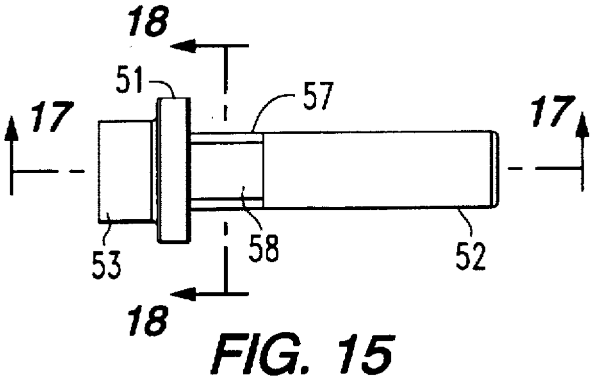
FIG. 15 is a side view of a cam pin.
Figure 16:
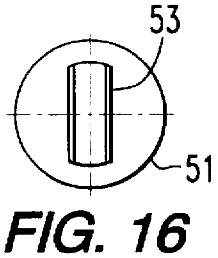
FIG. 16 is an end view of a cam pin.
Figure 18:
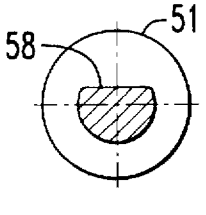
FIG. 18 is an end sectional view of a cam pin.
Figure 17:
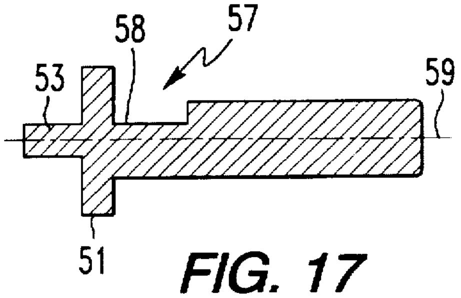
FIG. 17 is a side sectional view of a cam pin.

As shown in detail in the perspective view of FIG. 14, the side view of FIG. 15, the end view of FIG. 16 and the cross sectional views of FIGS. 17 and 18, pin 50 has a first, head end 51 thereof which contains a raised key element 53, that is configured to be seized by the craftsperson (for example gripped between the thumb and forefinger) to rotate the pin 50 between first and second rotational positions about its longitudinal axis 59 within the transverse bore 37 of the blade receptacle 10. Immediately beneath and adjacent to the head end 51 of the pin 50, the shaft portion 55 of pin 50 has an indented, cam-shaped surface region 57. This indented, cam-shaped surface region 57 of pin 50 has a flat surface region 58 and has an axial length such that for a first rotational position of the pin 50 about axis 59 in the transverse bore 37 of the blade receptacle 10, during axial translation of the wire insertion blade 40 into the axial bore 33 of the blade receptacle 10, the pin 50 will enter a cam-shaped opening 61 in a scissor-configured, wire cutting blade 60 (shown in detail in FIG. 26, to be described). For a second rotational position of the pin 50 about its axis 59, during axial translation of the wire insertion blade 40 into bore 33 of the blade receptacle 10, the pin 50 will engage the surface of the cam-shaped opening 61 of the wire-cutting blade 60, and thereby cause the wire-cutting blade 60 to rotate relative about a pivot pin 70 that passes through a pin aperture 62 into the wire insertion blade 40 and is retained in a bore 42 in the wire insertion blade 40.

Figure 19:
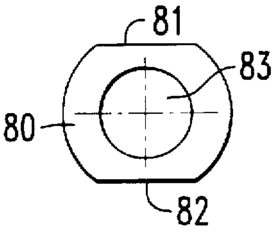
FIG. 19 is an end view of a cam-shaped retainer cap.
Figure 21:
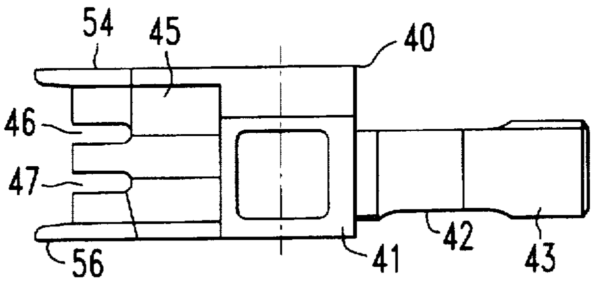
FIG. 21 is a side view of a wire insertion blade.
Figure 20:
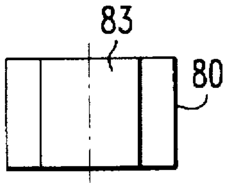
FIG. 20 is a side view of a cam-shaped retainer cap.
Figure 22:
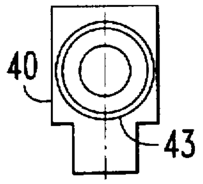
FIGS. 22 and 23 are opposite end views of a wire insertion blade.
Figure 23:
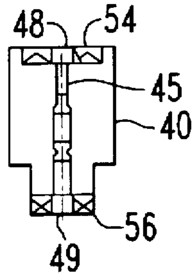
Figure 24:
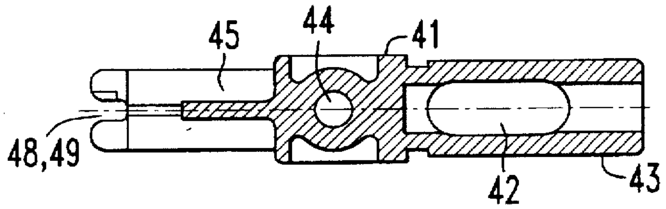
FIGS. 24 and 25 are respective sectional views of a wire insertion blade.
Figure 25:
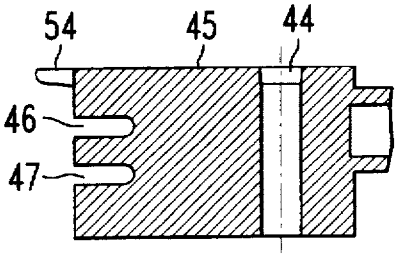

A generally circular cam-shaped retainer ring, or cap element 80 is shown in detail in FIGS. 19 and 20 as comprising a pair of generally parallel flat surfaces 81 and 82 and a circular bore 83 is friction fit to a second end 52 of the pin 50. The flat surfaces 81 and 82 of cap element 80 are sized to be engaged by respective flexible inwardly canted side tangs 91 and 92 that are bent upwardly from a generally flat section 93 of a retainer clip 90, shown in the exploded view of FIG. 1 and in FIGS. 2, 3 and 6. As shown in FIG. 1, between the side tangs 91 and 92, the flat section 93 of the clip 90 has an aperture 96 that is sized to allow the cylindrical shaft of the pin 50 to pass therethrough. The retainer clip 90 further includes a pair of inverted sidewall elements 94 and 95 that are sized to align and frictionally fit the clip 90 along the top and bottom surfaces 23 and 25 of the blade receptacle 10.

The wire insertion blade member 40 is configured to conform with the structure of a standard industrial type blade. As a non-limiting example, the blade may be configured to be usable with industrial type termination blocks, such as a BIX type termination block manufactured by Northern Telecom, as a non-limiting example. (BIX is a Registered trademark of Northern Telecom). For such a block, as diagrammatically illustrated in the exploded view of FIG. 1, the side view of FIG. 21, the end views of FIGS. 22 and 23, and the cross-sectional views of FIGS. 24 and 25, the wire insertion blade 40 has a generally rectangular frame-configured base region 41 that is contiguous with the cylindrical shaft portion 43. As described above, and as will be detailed infra, the cylindrical shaft portion 43 has a longitudinal axial slot 42 through which the pin 50 mounted in the blade receptacle 10 passes during relative axial translation between blade receptacle 10 and blade 40.

The frame-configured base region 41 of the wire insertion blade 40 has a bore 44 that is sized to receive pivot pin 70, so as to allow the wire-cutting blade 60 to rotate or pivot relative to the wire insertion blade 40. Extending from the generally rectangular frame-configured base region 41 are a first, generally flat blade portion 45 having a pair of wire insertion depressions 46, 47 and a pair of sidewall portions 54 and 56, contiguous therewith and which have respective depressions 48 and 49 at distal or end portions thereof. Depressions 48 and 49 of the sidewall portions 54 and 56, respectively, are configured to receive and engage a wire to be seated in a terminal element.

Figure 26:
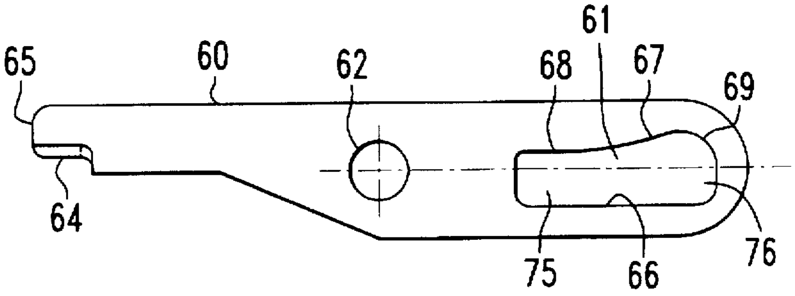
FIG. 26 shows a scissor configured, wire-cutting blade.

The wire cutting blade 60 of for use with a BIX type termination block is diagrammatically illustrated in detail in FIG. 26 as a generally flat scissor having a wire-cutting edge 64 at a distal end 65 thereof for cutting a wire that has been engaged by depressions 48 and 49 of the respective sidewall portions 54 and 56 of wire insertion blade 40. Blade 60 has pin aperture 62 that is located so that when cutting blade pivot pin 70 is passed through aperture 62 and into bore 44 of the wire insertion blade 40, the cutting edge 64 at the distal end 65 of scissor-configured cutting blade 60 will become rotationally aligned with depressions 48 and 49 at distal end of wire insertion blade 40, and pin 50 passes through cam aperture 61 of the blade 60.

As shown in detail in FIG. 26, the cam aperture 61 of blade 60 has a generally linear edge portion 66 that is spaced apart from an opposing curved edge portion 67. Curved edge portion 67 has a generally linear edge portion 68 parallel to linear edge portion 66 so as to define a reduced width region 75 therebetween. Curved edge portion 67 flares along an edge portion 69 to increase the width of the opening presented by cam aperture 61 to a large diameter region 76.

Figure 30:
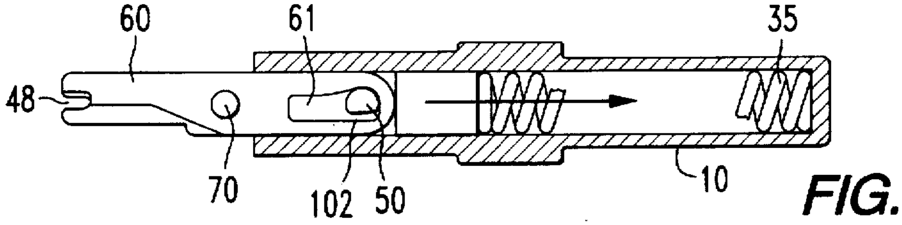
FIGS. 30–32 are simplified cross-sectional views showing the operational sequence for the cutting mode of operation of the wire-insertion and cutting head assembly of the present invention.
Figure 31:
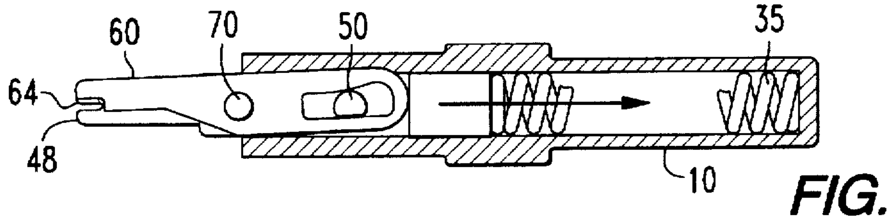
Figure 32:
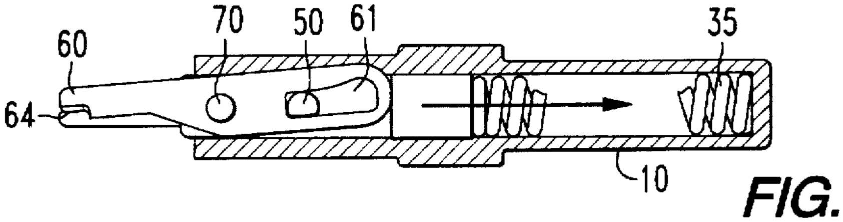

The operation of the wire-insertion and cutting head assembly of the present invention will now be described with reference to the simplified cross-sectional views of FIGS. 27–32. In the operational sequence of FIGS. 27–32, FIGS. 27–29 show the non-cutting (wire-seating only) mode of operation, and FIGS. 30–32 show the cutting (wire seating and severing) mode of operation.

NON-CUTTING MODE (FIGS. 27–29)

Figure 27:
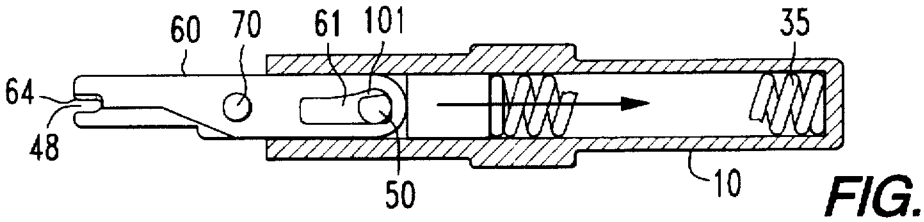
FIGS. 27–29 are simplified cross-sectional views showing the operational sequence for the non-cutting mode of operation of the wire-insertion and cutting head assembly of the present invention.

As shown in FIG. 27, to effect the non-cutting mode of operation, the pin 50 is rotated about axis 59, so that the flat surface portion 58 of its cam-shaped surface region 57 faces the curved edge portion 67 of cam aperture 61. This orientation of pin 50 creates a spacing or gap 101 at the flared edge portion 69 where the width of the opening presented by cam aperture 61 is greatest.

Figure 28:
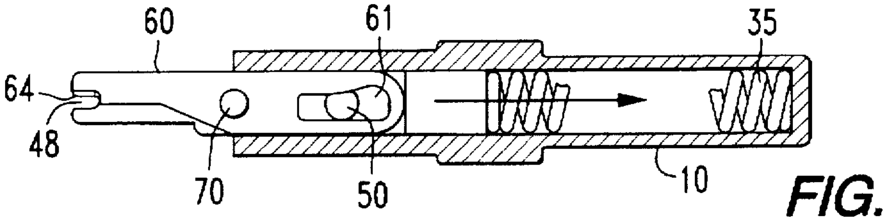
Figure 29:
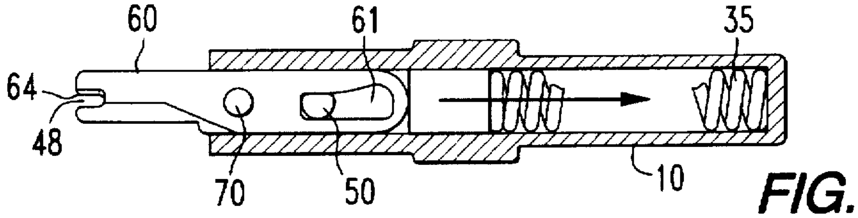

As a result, with a wire engaged by the depressions 48 and 49 of sidewall portions 44 and 46, as it is seated in the terminal block, then, during axial translation of the wire insertion blade 40 into the axial bore 33 of the blade receptacle 10 and compressing spring 35, the axial bore 55 of shaft portion 53 of wire insertion blade 40 passes by the cylindrical shaft portion of pin 50, and the cam-shaped surface 57 of the pin 50 enters into and passes through the reduced width region 75 of the cam-shaped opening 61 of scissor-shaped blade 60, as shown in FIGS. 28 and 29.

CUTTING MODE (FIGS. 30–32)

To effect the seating and cutting mode of operation, pin 50 is rotated 180° about axis 59, so that the flat surface portion 58 of its cam-shaped surface region 57 faces the linear edge portion 66 of cam aperture 61, as shown in FIG. 30. This orientation of pin 50 creates a spacing or gap 102 between the linear edge portion 66 and the flat surface portion 58 of cam-shaped surface region 57 and brings the cylindrical surface of the shaft of pin 50 alongside the flared edge portion 69 of cam aperture 61.

In this reversed orientation of pin 50, with a wire seated in the terminal block and engaged by the depressions 48 and 49 of sidewall portions 44 and 46, then, during axial translation of the wire insertion blade 40 into the axial bore 33 of the blade receptacle 10, the axial bore 55 of the shaft portion 53 of wire insertion blade 40 will again translate past the cylindrical shaft portion of pin 50. However, since the cylindrical surface of the shaft of pin 50 is oriented to be alongside the flared edge portion 69 of cam aperture 61, then during axial translation of the wire insertion blade 40 into the bore 33 of the blade receptacle 10, the cylindrical shaft portion of the pin 50 will engage the curved surface 67 of the cam-shaped opening 61 in the wire-cutting blade 60, and thereby cause the wire-cutting blade 60 to rotate about pivot pin 70, in a counter-clockwise direction, as shown in FIG. 31. This rotation of the scissor blade brings the cutting edge 64 of the distal end 65 of scissor-configured cutting blade 60 across the depression 48 in the wire insertion blade 40, and into a wire that has been captured in the depressions 48 and 49.

With further axial translation of the wire insertion blade 40 into the bore 33 of the blade receptacle 10, the cylindrical shaft portion of the pin 50 will continue to engage the curved surface 67 of the cam-shaped opening 61 in the wire-cutting blade 60, and thereby cause the wire-cutting blade 60 to continue is counter-clockwise rotation about pivot pin 70, as shown in FIG. 32. This further rotation of the blade 60 causes the cutting edge 64 of the distal end 65 of scissor-configured cutting blade 60 to close the depression 48 in the wire insertion blade 40, and thereby completely cut through or sever a wire that has been captured in the depressions 48 and 49 of the wire insertion blade 40.

As will be appreciated from the foregoing description, the shortcomings of a conventional wire-insertion and cutting head of a telephone craftsperson's impact tool described above are effectively obviated by wire-insertion and cutting head assembly of the present invention, which is selectively operable to effect either a non-cutting (wire-seating only) mode of operation, or a cutting (wire seating and severing) mode of operation, by means of a rotatable cam pin-based arrangement. The cam-pin based arrangement is configured such that, during axial translation of the wire insertion blade into the bore of the blade receptacle, the axial bore of the shaft portion of the wire insertion blade passes by the cylindrical shaft portion of the cam pin, and the cam-shaped surface of the cam pin enters into and passes through the reduced width region of the cam-shaped opening of the scissor-shaped blade, which prevents rotation of the cutting blade. To seat and cut a wire, the cam pin is simply rotated, so that the cylindrical surface of the pin shaft is oriented to be alongside the flared edge portion of the cam aperture, whereby the cylindrical shaft portion of the cam pin will engage the curved surface of the cam-shaped opening in the wire-cutting blade and cause the wire-cutting blade to rotate across the depression in the wire insertion blade and into a wire that has been captured in the depressions of the wire insertion blade, severing the wire.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A wire-insertion and cutting head assembly for a craftsperson's impact tool comprising:
   - a blade member receptacle, which is installable in a handle of said tool;
   - a wire insertion blade member having a first portion, which is configured to receive a wire to be seated in a terminal element, and a second portion which is configured to be axially translatable relative to said blade member receptacle; and
   - a wire cutting blade member mounted with said wire insertion blade member and having a first portion, which is configured to cut a wire received by said wire insertion blade member; and wherein
   - said wire cutting blade member is mounted to said wire insertion blade member so as to be axially translatable together with said wire insertion blade member relative to said blade member receptacle, and selectively rotatable relative to said wire insertion blade member; and wherein
   - said second portion of said wire insertion blade member comprises a shaft portion having a slot therein that is sized to receive a pin captured in said blade member receptacle,
   - said blade member receptacle has a first, axial bore which is sized to receive said shaft portion of said wire insertion blade member and having a second bore generally transverse to said axial bore, and a pin captured in said second bore and passing through said slot in said shaft portion of said wire insertion blade member,
   - said wire cutting blade member is pivotally mounted to said wire insertion blade member, and has a cam opening therein which is sized to receive said pin captured in said blade member receptacle, and
   - said pin has a cam surface which, for a first position of said pin as captured in said blade member receptacle, provides axial translation of said cam opening of said wire cutting blade member relative to said pin, so as to allow said wire cutting blade member to translate together with said wire insertion blade member axially relative to said blade member receptacle and, for a second position of said pin as captured in said blade member receptacle, engages a surface of said wire cutting blade member in said cam opening of said wire cutting blade member, so as to cause said wire cutting blade member to rotate relative to said wire insertion blade member and cut a wire received thereby.

2. A wire-insertion and cutting head assembly according to claim 1, wherein said pin has a cam surface which is configured such that, for a first rotational position of said pin in said second bore of said blade member receptacle, said pin enters said cam opening of said wire cutting blade member as said wire insertion blade member translates axially relative to said blade member receptacle and, for a second rotational position of said pin as captured in said blade member receptacle, engages said surface of said wire cutting blade member in said cam opening of said wire cutting blade member, causing said wire cutting blade member to rotate relative to said wire insertion blade member and cut a wire received thereby.

3. A wire-insertion and cutting head assembly according to claim 2, wherein said wire cutting blade member comprises a generally flat scissor having a first portion configured to cut a wire received by said wire insertion blade member, said cam opening being formed in a second portion of said scissor, and wherein said scissor is pivotally mounted to said wire insertion blade member such that said cam opening is adjacent to said slot in said shaft portion of said wire insertion blade member, so that said pin passes through each of said cam opening of said scissor and said slot in said wire insertion blade member.

4. A wire-insertion and cutting head assembly according to claim 3, wherein a first end of said pin is cam-shaped and sized to be engaged by a clip member mounted on said blade member receptacle and thereby secure said pin in each of said first and second rotational positions.

5. A wire-insertion and cutting head assembly according to claim 3, further including a cam-shaped cap element mounted to a first end of said pin and being sized to be engaged by a clip member mounted on said blade member receptacle so as to secure said pin in each of said first and second rotational positions.

6. A wire-insertion and cutting head assembly according to claim 5, wherein a second end of said pin includes a key element that is configured to be seized and rotate said pin between said first and second rotational positions.

7. A wire-insertion and cutting head assembly for a craftsperson's impact tool comprising a blade receptacle installable in a handle of said tool, a wire insertion blade configured to engage a wire to be seated in a terminal element, and being translatable relative to said blade receptacle, and a wire cutting blade pivotally mounted to said wire insertion blade member, and being coupled to a movable cam pin supported by said blade receptacle, so that for a first orientation of said cam pin, said cutting blade is prevented from rotation relative to said wire insertion blade during translation of said wire insertion blade, and for a second orientation of said cam pin said wire cutting blade is caused to rotate relative to said wire insertion blade and cut a wire that has been engaged by said wire insertion blade; and wherein said blade receptacle comprises a generally longitudinally shaped, wire insertion and cutting blade receptacle having a generally cylindrically shaped end body portion sized to engage a blade mounting fixture of said tool handle, said blade receptacle having a recess region which accommodates said wire insertion blade, and having an axial bore which receives a compression spring and a shaft portion of said wire insertion blade, and a transverse bore sized to receive said cam pin which passes through a slot in a shaft portion of said wire insertion blade.

8. A wire-insertion and cutting head assembly according to claim 7, wherein said cam pin has an indented, cam-shaped surface region, such that, for said first rotational position of said cam pin, translation of said wire insertion blade into said axial bore of said blade receptacle, causes said cam-shaped surface region of said cam pin to enter a cam-shaped opening in said wire-cutting blade, which prevents rotation of said wire-cutting blade, and for said second rotational position of said cam pin, said cam pin engage the surface of said cam-shaped opening of said wire-cutting blade, causing said wire-cutting blade to rotate and cut a wire engaged by said wire insertion blade.

9. A wire-insertion and cutting head assembly according to claim 8, wherein said cam pin has a key element configured to enable the pin to be rotated between said first and second rotational positions within said transverse bore of said blade receptacle.

10. A wire-insertion and cutting head assembly according to claim 9, wherein a first end of said cam pin is cam-shaped and sized to be engaged by a clip member mounted on said blade receptacle and thereby secure said cam pin at each of said first and second rotational positions.

11. A wire-insertion and cutting head assembly according to claim 8, wherein said cam-shaped opening in said wire-cutting blade has a generally linear edge portion spaced apart from an opposing curved edge portion having a generally linear edge portion parallel to the linear edge portion so as to define a reduced width region therebetween, and wherein said curved edge portion flares to increase the width of the opening to a large diameter region.

* * * * *